United States Patent
Elshaer et al.

(10) Patent No.: US 10,427,532 B2
(45) Date of Patent: Oct. 1, 2019

(54) ON-BOARD AND WIRELESS VEHICLE CHARGING SYSTEMS WITH SHARED COMPONENTS

(71) Applicant: Ford Global Technologies, LLC, Dearborn, MI (US)

(72) Inventors: Mohamed Elshaer, Dearborn, MI (US); Chingchi Chen, Ann Arbor, MI (US); Mark J. Ferrel, Brighton, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/479,687

(22) Filed: Apr. 5, 2017

(65) Prior Publication Data

US 2018/0290545 A1 Oct. 11, 2018

(51) Int. Cl.
| | |
|---|---|
| *H02J 7/00* | (2006.01) |
| *B60L 11/18* | (2006.01) |
| *H02M 3/335* | (2006.01) |
| *B60L 1/00* | (2006.01) |
| *B60L 53/14* | (2019.01) |
| *B60L 53/22* | (2019.01) |
| *B60L 53/12* | (2019.01) |
| *B60L 58/20* | (2019.01) |

(52) U.S. Cl.
CPC .............. *B60L 11/182* (2013.01); *B60L 1/00* (2013.01); *B60L 53/12* (2019.02); *B60L 53/14* (2019.02); *B60L 53/22* (2019.02); *B60L 58/20* (2019.02); *H02M 3/335* (2013.01); *B60L 2210/10* (2013.01); *B60L 2210/30* (2013.01); *B60L 2210/40* (2013.01); *Y02T 10/7005* (2013.01); *Y02T 10/7088* (2013.01); *Y02T 10/7241* (2013.01); *Y02T 90/122* (2013.01); *Y02T 90/14* (2013.01)

(58) Field of Classification Search
CPC ........ H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| | | | |
|---|---|---|---|
| 9,381,821 B2 | 7/2016 | Keeling et al. | |
| 2008/0203966 A1* | 8/2008 | Ward ........................ | H02J 7/35 320/104 |
| 2009/0242291 A1* | 10/2009 | Sagawa .................. | B60K 15/05 180/65.265 |
| 2011/0202220 A1* | 8/2011 | Seta .......................... | B60L 1/00 701/22 |
| 2013/0024059 A1* | 1/2013 | Miller ..................... | H02J 50/12 701/22 |
| 2013/0076122 A1* | 3/2013 | Ohtomo .................... | H02J 3/32 307/9.1 |
| 2013/0134933 A1* | 5/2013 | Drew ....................... | H02H 5/04 320/109 |
| 2014/0062394 A1* | 3/2014 | Khan ................... | B60L 11/1812 320/108 |

(Continued)

*Primary Examiner* — Arun C Williams
(74) *Attorney, Agent, or Firm* — David B. Kelley; Brooks Kushman P.C.

(57) ABSTRACT

A vehicle includes a traction battery, an on-board charging system (OBCS), and a wireless power transfer system (WPTS). Each of the OBCS and WPTS is configured to selectively use a same rectifier such that the rectifier rectifies output of the OBCS and rectifies output of the WPTS to provide power to the traction battery.

17 Claims, 5 Drawing Sheets

(56) References Cited

U.S. PATENT DOCUMENTS

2014/0321169 A1* 10/2014 Mueller ............ H02M 3/33515
                                                                                               363/21.02
2015/0200547 A1    7/2015 Nakashima et al.

* cited by examiner

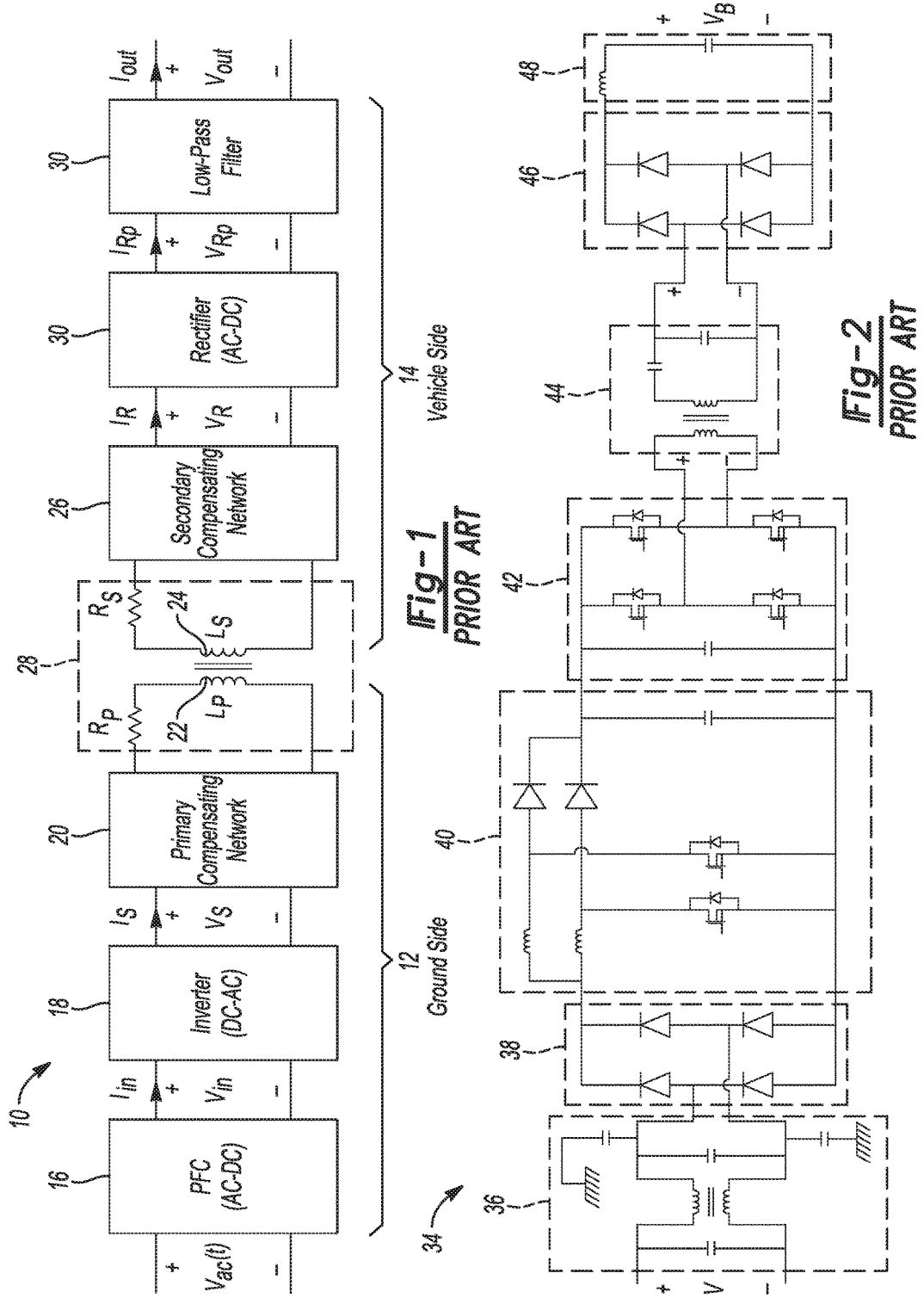

ON-BOARD AND WIRELESS VEHICLE CHARGING SYSTEMS WITH SHARED COMPONENTS

TECHNICAL FIELD

This disclosure relates to vehicles including on-board charging and wireless charging systems.

BACKGROUND

Wireless power transfer (WPT) has been gaining attention among vehicle manufacturers as a viable method to charge batteries. In certain cases, it is offered as an add-on option and does not replace the on-board charger. Hence, vehicles that have the WPT add-on may have the capability to either charge their batteries conductively or wirelessly.

SUMMARY

A vehicle includes a traction battery, and an on-board charging system (OBCS) and a wireless power transfer system (WPTS) each configured to selectively use a same rectifier such that the rectifier rectifies output of the OBCS and rectifies output of the WPTS to provide power to the traction battery.

A method for charging a vehicle includes, by a controller, responsive to a request to charge a battery of the vehicle via an on-board charging system (OBCS), utilizing a rectifier to rectify output of the OBCS to provide power to the battery, and responsive to a request to charge the battery via a wireless power transfer system (WPTS), utilizing the rectifier to rectify output of the WPTS to provide power to the battery.

A vehicle includes a traction battery, a high voltage to low voltage DC-DC converter including an inverter, and an on-board charging system (OBCS) and a wireless power transfer system (WPTS) each configured to selectively use the inverter such that the inverter rectifies output of the OBCS and rectifies output of the WPTS to provide power to the traction battery.

BRIEF DESCRIPTION OF THE DRAWINGS

FIG. 1 is a schematic diagram of a prior art wireless power transfer (WPT) system.

FIG. 2 is a schematic diagram of a prior art on-board charging (OBC) system.

DETAILED DESCRIPTION

Figure 3:
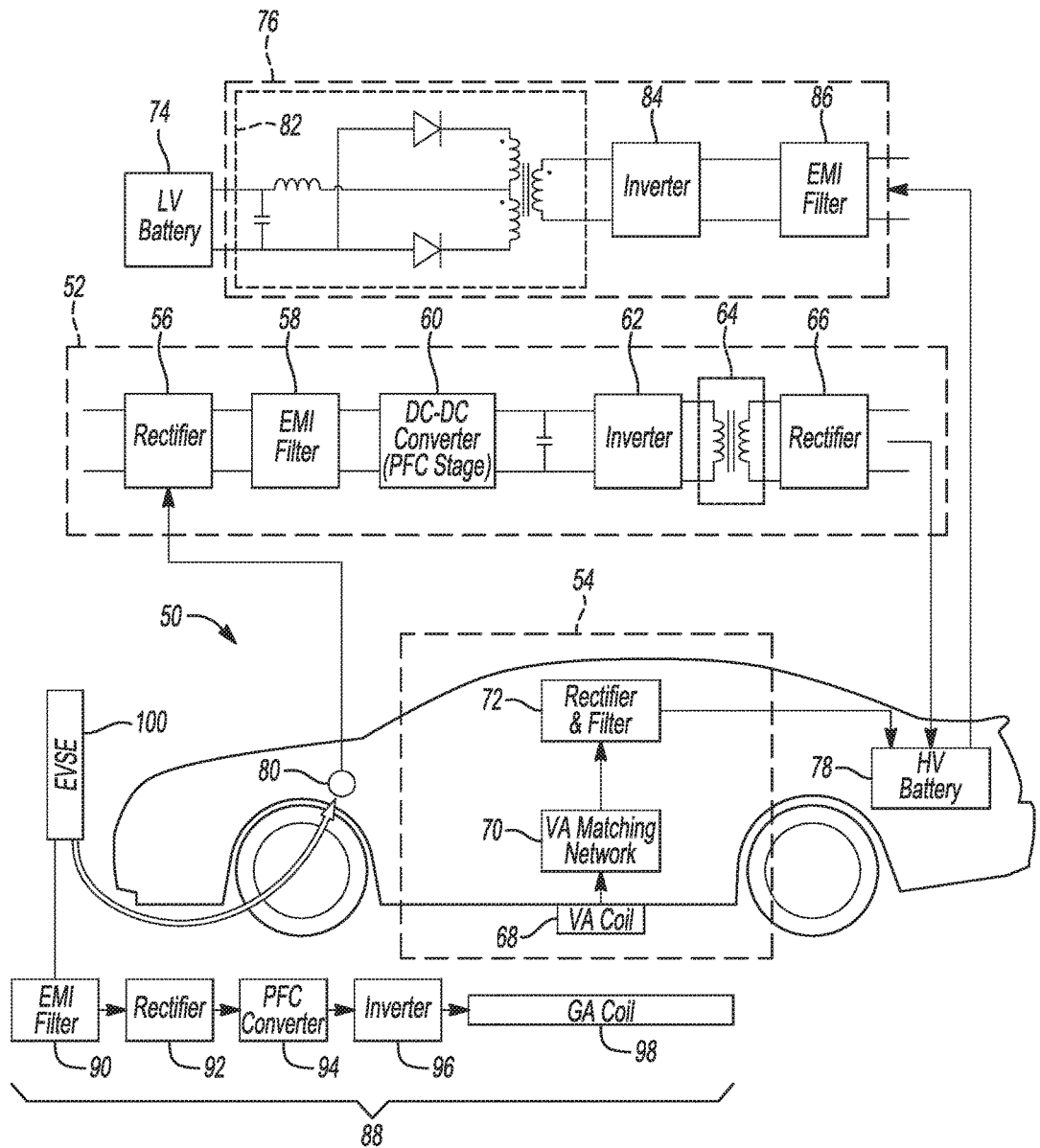
FIG. 3 is a schematic diagram of a prior art vehicle with WPT and OBC systems, and a charging station.

Various embodiments of the present disclosure are described herein. However, the disclosed embodiments are merely exemplary and other embodiments may take various and alternative forms that are not explicitly illustrated or described. The Figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The overall cost of vehicle charging systems is expected to increase due to added wireless power transfer (WPT) system hardware. Currently plug-in electric vehicles (PHEVs) are equipped with an on-board charger (OBC) and a high voltage to low voltage (HV-to-LV) DC-DC converter. In order to perform the WPT function, additional hardware is installed in the ground side. This hardware includes a power factor correction circuit (PFC), an electromagnetic interference (EMI) filter, a bridge rectifier, an inverter, and a matching network. The vehicle side also includes a matching network and rectifier. Output of the WPT system may be connected directly to the battery.

To reduce total system cost, components of the OBC and/or HV-to-LV DC-DC converter may be shared with the WPT system. Several approaches for integrating the WPT system with the OBC are proposed herein.

A common rectifier, for example, can be shared between the OBC and WPT system. The output of the vehicle side matching network is coupled to the input of the OCB's rectifier via a switch. This implementation allows the utilization of the OBC's output rectifier and filter during WPT system operation. The battery is thus charged with DC current. Two switches may be necessary to decuple the OBC from the WPT system depending on the method of charging. If charging is done via the conductive method, the OBC is used to charge the battery. Hence, the switch connecting the vehicle side matching network to the OBC is in the OFF state while the switch inside the OBC is in the ON state: The WPT system components do not interfere with operation of the OBC. Similarly when the battery is wirelessly charging, the switch inside the OBC is in the OFF state while the switch connecting the vehicle side matching network to the OBC is in the ON state: The OBC components do not interfere with operation of the WPT system. In the case where AC current charging is allowed, a similar solution can be implemented.

The on-board HV to LV DC-DC converter can also be used to perform rectification and filtering functions for the OBC and WPT system. If the system is designed to prevent charging of the LV battery while charging the HV battery, the HV to LV DC-DC converter's inverter maybe used to perform synchronous rectification for both the wireless and on-board chargers. If the output of the WPT matching network is connected as contemplated herein, the HV to LV DC-DC converter inverter switches may be utilized to perform the rectification function for both the wireless and onboard chargers.

FIG. 1 is schematic diagram of a typical WPT system 10. The system 10 includes a ground assembly (GA) portion 12 and vehicle assembly (VA) portion 14. The GA portion 12 includes an AC-to-DC converter 16, an inverter 18, a primary compensating network 20, and a ground coil 22. The converter 16 performs the power factor correction function, and its output is a constant voltage that is fed to the inverter 18. The inverter 18 converts the constant voltage to a high frequency AC voltage. In order to maintain a low volt-amp stress on components, the output voltage of the inverter 18 is fed to the primary compensating network 20, which includes reactive components (i.e., inductors and/or capacitors). Output of the network 20 is then fed to the ground coil 22.

The VA portion 14 includes a receive coil 24, a secondary compensating network 26, a rectifier 30, and a low-pass filter 32. During power transfer, the receive coil 24 is weakly coupled to the ground coil 22. Output of the receive coil 24 is fed to the network 26. The networks 20, 26 thus are used to create a resonant tank network 28 allowing the coils 22, 24 to transfer large amounts of power at acceptable volt-amp levels. Output of the network 26 is fed to the rectifier 30, and then the low-pass filter 32 to supply DC power to charge a battery. Battery power can thus be regulated by controlling switches of the inverter 18.

FIG. 2 is a schematic diagram of the stages of a typical on-board charging system 34. The system 34 includes an EMI filter 36, a rectifier 38, a two-phase interleaved boost converter 40, an inverter 42, a reactive compensation network 44, a rectifier 46, and another EMI filter 48. The converter 40 performs the power factor correction function.

FIG. 3 is a schematic diagram of a typical plugin hybrid/electric vehicle 50 including an on-board charging system 52 and WPT system 54. The systems 52, 54 are similar to the VA portion 14 (FIG. 1) and system 34 (FIG. 2) respectively. Thus, the system 52 includes a rectifier 56, an EMI filter 58, a DC-DC converter 60, an inverter 62, a reactive compensating network 64, and a rectifier 66. And, the system 54 includes a receive coil 68, a secondary compensating network 70, and a rectifier and filter 72. The vehicle 50 also includes a LV battery 74, a HV-to-LV DC-DC converter 76, a HV battery 78, and a plugin port 80. The converter 76 includes typical circuitry 82, an inverter 84, and an EMI filter 86.

Output from the plugin port 80 is fed to the system 52. Output from each of the systems 52, 54 can be used to charge the HV battery 78. And, output from the HV battery 78 can be fed to the converter 76 to charge the LV battery 74. The systems 52, 54, however, cannot operate at the same time. Hence, their components could be shared to reduce cost and improve packaging. Additionally, if the converter 76 is not operational during charging, some of its components may be used to perform the charging function as well.

The system 54 is shown proximate a GA portion 88, which is similar to the GA portion 12 (FIG. 1). Thus, the GA portion 88 includes an EMI filter 90, a rectifier 92, a PFC converter 94, an inverter 96, and a ground coil 98. Electric vehicle supply equipment 100 is used to supply power to the plugin port 80 or GA portion 88.

The HV battery 78 may be charged conductively or wirelessly. An isolated high voltage to low voltage DC-DC converter is used to transfer power from the HV battery to LV battery.

Figure 4:
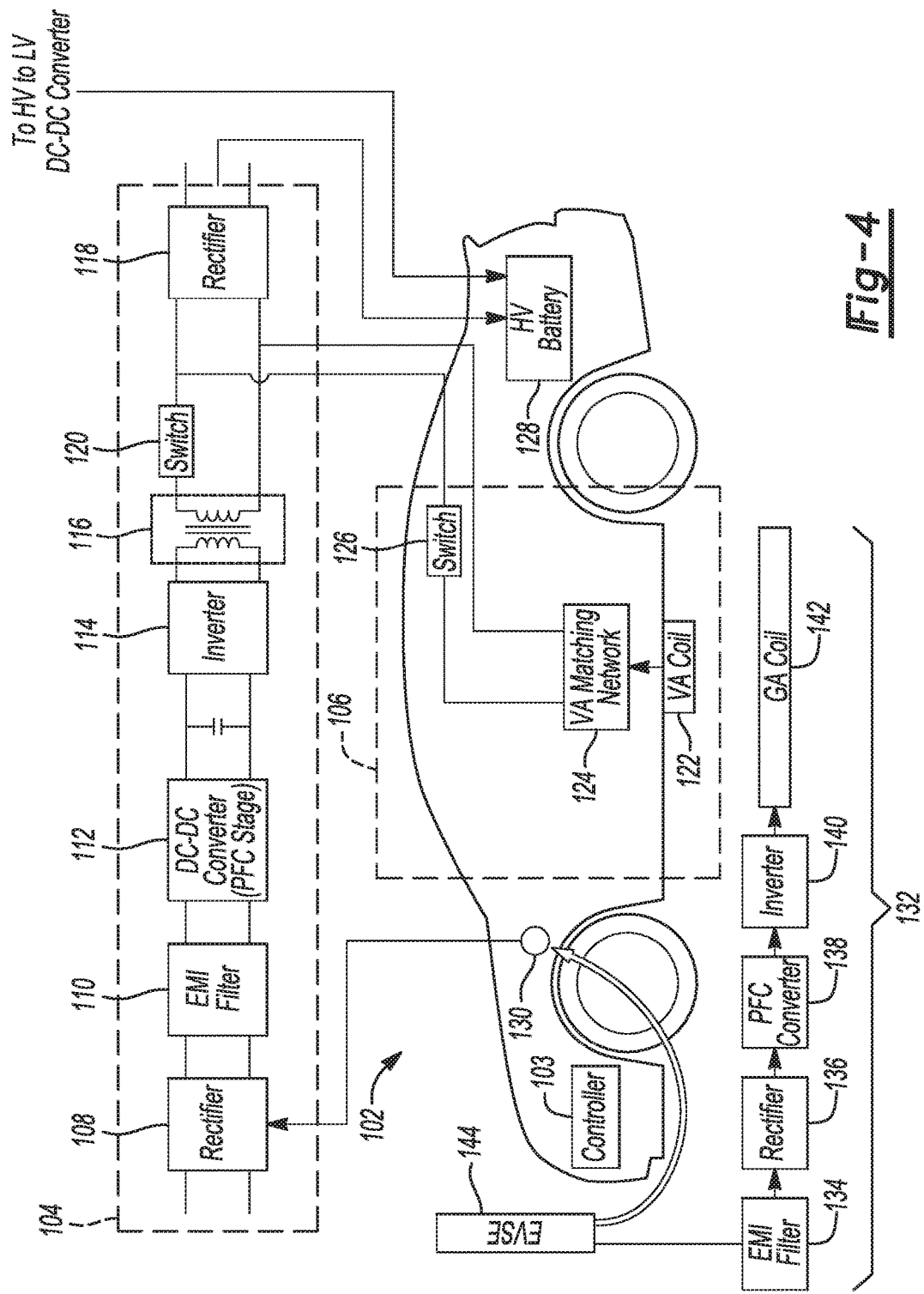
FIG. 4 is a schematic diagram of a vehicle with WPT and OBC systems, and a charging station.

FIG. 4 is a schematic diagram of a plugin hybrid/electric vehicle 102 including a controller 103, and an on-board charging system 104 and WPT system 106 with shared components. The system 104 includes a rectifier 108, an EMI filter 110, a DC-DC converter 112, an inverter 114, a reactive compensating network 116, and a rectifier 118—much like the system 52 (FIG. 3). The system 104, however, also includes a switch 120, whose operation will be described in further detail below. The system 106, like system 54 (FIG. 3), includes a receive coil (or coils) 122 and a secondary compensating network 124. And instead of a rectifier, the system 106 includes a switch 126. The vehicle 102 also includes a LV battery and HV-to-LV DC-DC converter (not shown), a HV battery 128, and a plugin port 130.

The controller 103, among other things, operates the switches 120, 126 to permit the system 106 to use the rectifier 118. During wireless charging, the switch 120 is turned off and the switch 126 is turned on thus creating a circuit including the rectifier 118, coil 122, network 124, and HV battery 128, and isolating the rest of the system 104 therefrom. During wired charging, the switch 120 is turned on and the switch 126 is turned off thus creating a circuit including the system 104 and battery 128, and isolating the system 106 therefrom.

The system 106 is shown proximate a GA portion 132, which is similar to the GA portion 12 (FIG. 1). Thus, the GA portion 132 includes an EMI filter 134, a rectifier 136, a PFC converter 138, an inverter 140, and a ground coil (or coils) 142. Electric vehicle supply equipment 144 is used to supply power to the plugin port 130 or GA portion 132.

Figure 5:
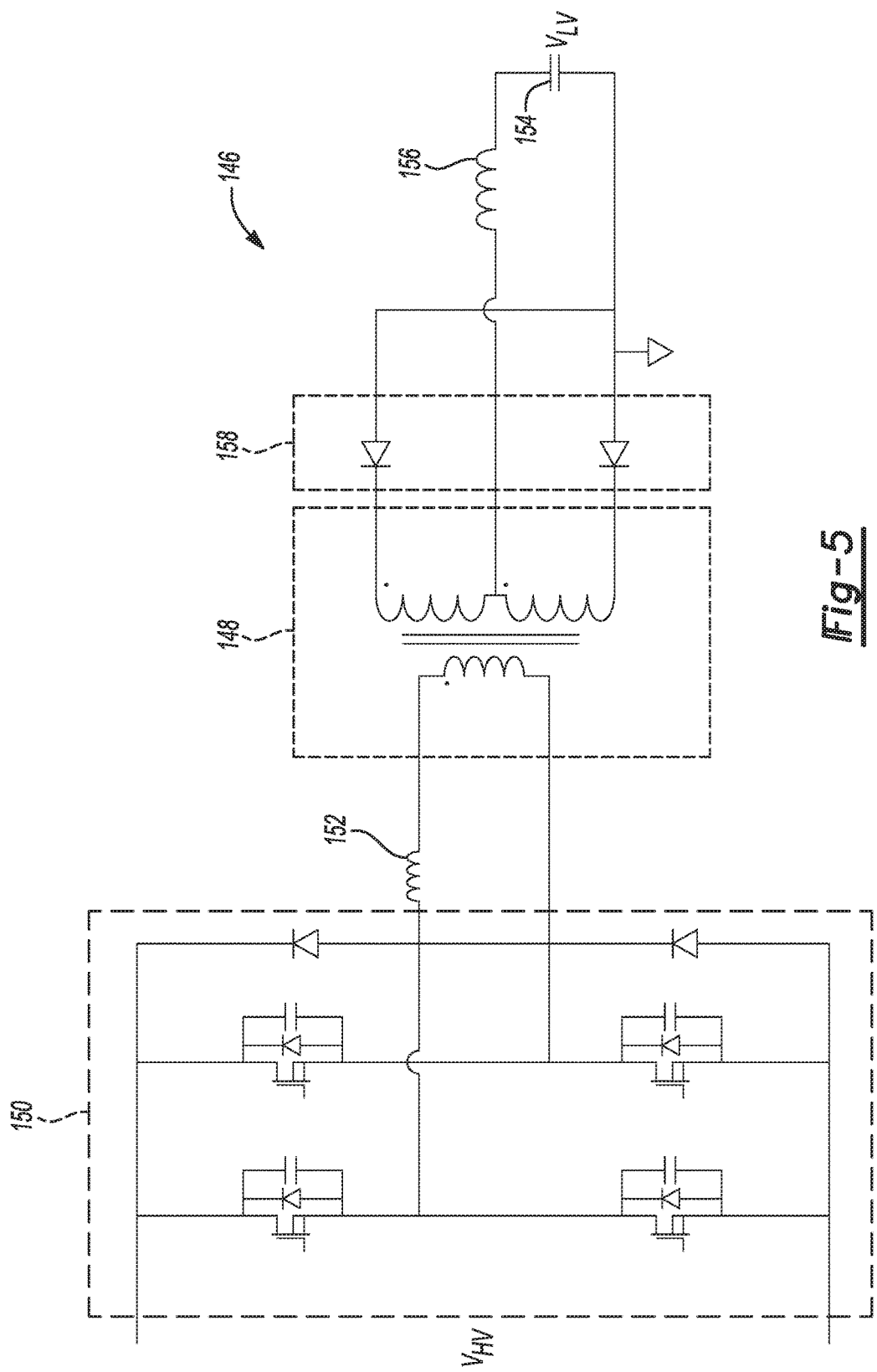
FIG. 5 is a schematic diagram of a high voltage to low voltage (HV-to-LV) DC-DC converter.

FIG. 5 is a schematic diagram of a HV to LV DC-DC converter 146. The converter 146 includes a transformer 148 separating high and low voltage sides. On the high voltage side, the converter 146 includes a collection of switches and diodes forming an inverter 150 and an inductor 152 electrically between a high voltage source (such as a high voltage battery) and the transformer 148. On the low voltage side, the converter 146 includes a capacitor 154, inductor 156, and diodes 158 electrically between a low voltage source (such as a low voltage battery) and the transformer 148. As discussed in more detail below, the converter 146 may be used within the context of the architectures above to perform synchronous rectification for the systems 104, 106 provided that simultaneous charging of low and high voltage batteries is not permitted.

Figure 6:
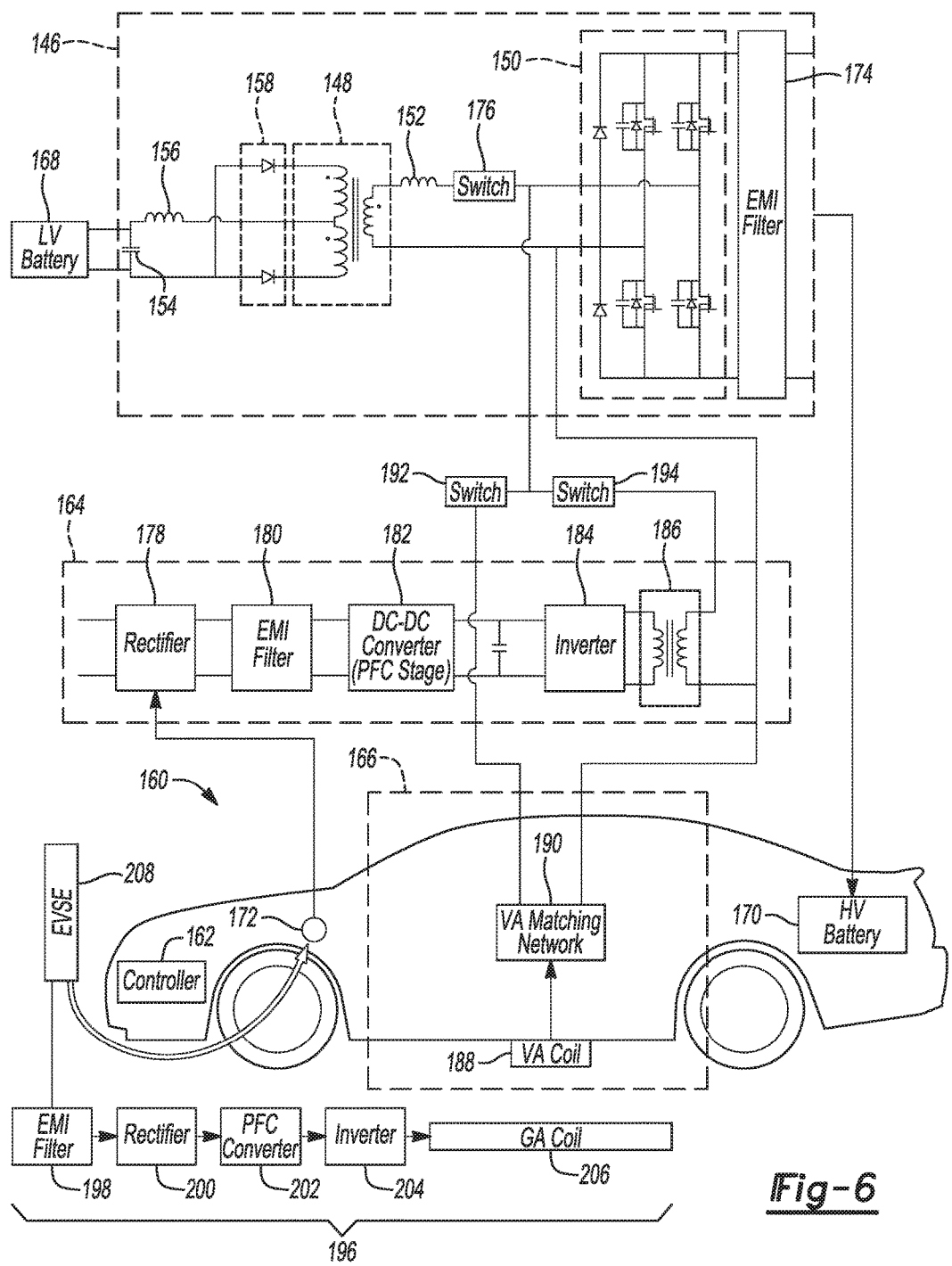
FIG. 6 is a schematic diagram of a vehicle with WPT and OBC systems and the HV-to-LV DC-DC converter of FIG. 5, and a charging station.

FIG. 6 is a schematic diagram of a plugin hybrid/electric vehicle 160 including the converter 146, a controller 162, an on-board charging system 164, a WPT system 166, LV and HV batteries, 168, 170, and a plugin port 172. In addition to the components described with reference to FIG. 6, the converter 146 further includes an EMI filter 174 electrically between the inverter 150 and HV battery 170, and a switch 176 (discussed further below) electrically between the inverter 150 and inductor 152. The system 164 includes a rectifier 178, an EMI filter 180, a DC-DC converter 182, an inverter 184, and a reactive compensating network 186. The system 166 includes a receive coil 188 and a secondary compensating network 190. The vehicle 106 further includes switches 192, 194 (discussed further below) to selectively electrically connect the systems 164, 166 with the converter 146.

The controller 162, among other things, operates the switches 176, 192, 194 to permit each of the systems 164, 166 to use the inverter 150 and EMI filter 174 when charging the HV battery 170. During wireless charging, the switch 176 is turned off, the switch 192 is turned on, and the switch 194 is turned off thus creating a circuit including the inverter 150, HV battery 170, EMI filter 174, coil 188, and network 190, and isolating the rest of the converter 146 therefrom. During wired charging, the switches 176, 192 are turned off, and the switch 194 is turned on thus creating a circuit including the inverter 150, system 164, HV battery 170, and EMI filter 174. During charging of the LV battery 168, the switch 176 is turned on, and the switches 192, 194 are turned off—isolating the systems 164, 166 therefrom.

The system 166 is shown proximate a GA portion 196, which includes an EMI filter 198, a rectifier 200, a PFC converter 202, an inverter 204, and a ground coil 206. Electric vehicle supply equipment 208 is used to supply power to the plugin port 172 or GA portion 196.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a low voltage battery;
a traction battery; and
an on-board charging system (OBCS) and a wireless power transfer system (WPTS) each configured to selectively use a same synchronous rectifier such that the synchronous rectifier rectifies output of the OBCS and rectifies output of the WPTS to provide power to the traction battery, wherein the synchronous rectifier is configured to transfer power from the low voltage battery to the traction battery.

2. The vehicle of claim 1, wherein the OBCS and WPTS include switches configured to selectively isolate the OBCS from the WPTS and traction battery.

3. The vehicle of claim 2 further comprising a controller configured to, responsive to a request to charge the traction battery via the WPTS, close a first of the switches associated with the WPTS and open a second of the switches associated with the OBCS.

4. The vehicle of claim 1, wherein the OBCS and WPTS include switches configured to selectively isolate the WPTS from the OBCS and traction battery.

5. The vehicle of claim 4 further comprising a controller configured to, responsive to a request to charge the traction battery via the OBCS, close a first of the switches associated with the OBCS, and open a second of the switches associated with the WPTS.

6. The vehicle of claim 1, wherein the OBCS includes the rectifier.

7. A method for charging a vehicle, comprising:
by a controller,
responsive to a request to charge a traction battery of the vehicle via an on-board charging system (OBCS), utilizing a synchronous rectifier to rectify output of the OBCS to provide power to the traction battery,
responsive to a request to charge the traction battery via a wireless power transfer system (WPTS), utilizing the synchronous rectifier to rectify output of the WPTS to provide power to the traction battery, and
responsive to a request to charge the traction battery via a low voltage battery, utilizing the synchronous rectifier to transfer output of the low voltage battery to the traction battery.

8. The method of claim 7 further comprising, responsive to the request to charge the battery via the OBCS, operating switches to isolate the WPTS from the OBCS and the battery.

9. The method of claim 7 further comprising, responsive to the request to charge the battery via the WPTS, operating switches to isolate the OBCS from the WPTS and the battery.

10. The method of claim 7, wherein the OBCS includes the rectifier.

11. A vehicle comprising:
a low voltage battery;
a traction battery;
a high voltage to low voltage DC-DC converter including an inverter; and
an on-board charging system (OBCS) and a wireless power transfer system (WPTS) each configured to selectively use the inverter such that the inverter rectifies output of the OBCS and rectifies output of the WPTS to provide power to the traction battery, wherein the inverter is configured to transfer power from the low voltage battery to the traction battery.

12. The vehicle of claim 11 further including switches configured to selectively isolate the OBCS from the WPTS and traction battery.

13. The vehicle of claim 12 further comprising a controller configured to, responsive to a request to charge the traction battery via the WPTS, open a first of the switches associated with the high voltage to low voltage DC-DC converter to isolate components thereof other than the inverter from the WPTS and traction battery.

14. The vehicle of claim 13, wherein the controller is further configured to, responsive to the request, open another of the switches to isolate the OBCS from the WPTS and traction battery.

15. The vehicle of claim 11 further including switches configured to selectively isolate the WPTS from the OBCS and traction battery.

16. The vehicle of claim 15 further comprising a controller configured to, responsive to a request to charge the traction battery via the OBCS, open a first of the switches associated with the high voltage to low voltage DC-DC converter to isolate components thereof other than the inverter from the OBCS and traction battery.

17. The vehicle of claim 16, wherein the controller is further configured to, responsive to the request, open another of the switches to isolate the WPTS from the OBCS and traction battery.

* * * * *